E. Quinn,
Boring Wood,

N°18,057 Patented Aug. 25, 1857.

UNITED STATES PATENT OFFICE.

EMMETT QUINN, OF TRENTON, NEW JERSEY.

BORING-MACHINE.

Specification of Letters Patent No. 18,057, dated August 25, 1857.

*To all whom it may concern:*

Be it known that I, E. QUINN, of Trenton, in the county of Mercer and State of New Jersey, have invented a new and useful Improvement in Boring-Machines; and I do hereby declare that the following is a full, clear, and exact description of the construction of the same and its operation, reference being had to the annexed drawing, forming part of this specification, in which—

Figure 1:
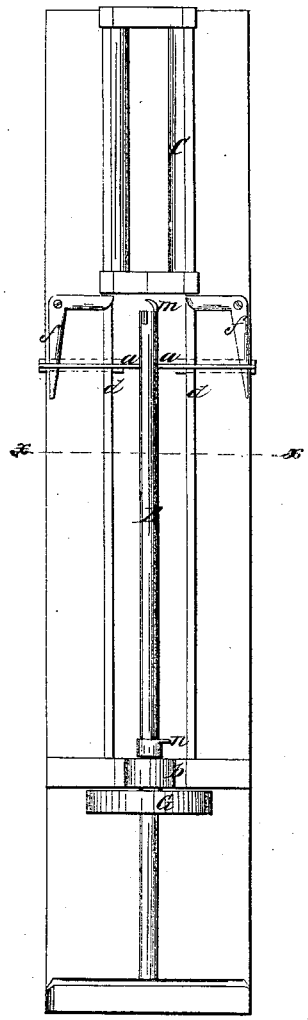
Figure 2:
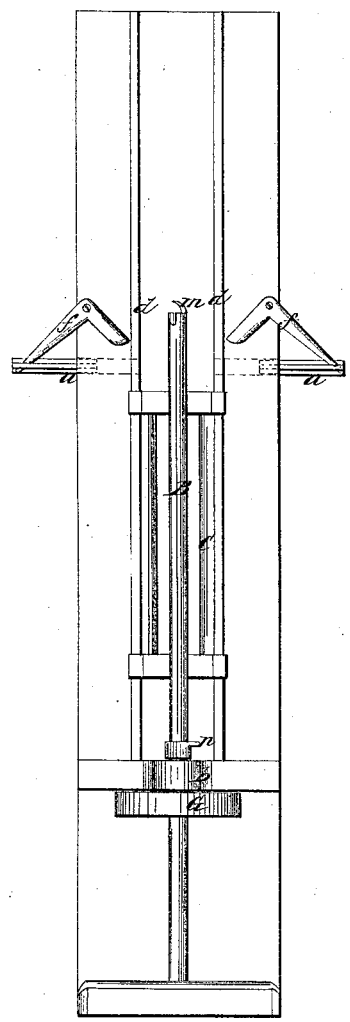
Figure 4:
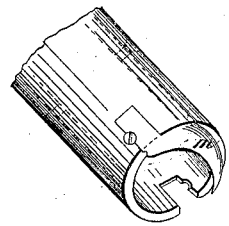
Figure 5:
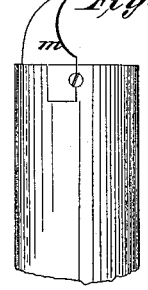
Figure 6:
Figure 3:
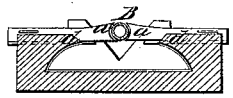

Figure 1 is a front elevation of the machine, before cutter enters the timber. Fig. 2 is an elevation after the frame carrying the timber has removed the upper guides. Fig. 3 is a cross section on $x\ x$. Figs. 4 and 5 show the cutter and head of boring tube. Fig. 6 shows a cutter head to be slipped upon the tube.

Similar letters denote the same part.

The machine which forms the subject of this specification is designed for boring out pump stocks.

The nature of my invention consists in a certain combination of devices hereinafter to be described, by which the log is permitted to pass over the boring tube so that its lower end may be operated upon by cutters at the bottom of the boring tube.

In the drawing B is the hollow boring tube, supported by guides $a\ a$ and $b$, and rotated by power applied to pulley $c$. Movable along the guide pieces $d\ d$ is a carriage C on which the log to be bored is secured. The feed is effected by the gravity of the log and the drawing cut of the bit.

The guides $a\ a$ are capable of sliding outward, and are connected with levers $f\ f$, which when pressed upon by the frame C will draw out the guides and permit the passage of the carriage. There may be springs to force the guides back or there may be a connection with the carriage which will close them as it ascends. But these are unnecessary as they can readily be forced in by hand.

The cutter $m$ is secured as shown in Figs. 4 and 5, and is of a curved form, sweeping from the extension inward, so that the point performs the first cutting and the cut progresses from the center outward.

The head shown in Fig. 6 is to be secured upon the tube if a larger bore is required. The cutter $n$ at the base of the tube is designed to trim the end square; and there may be another cutter at that position to increase the size of the bore for a short distance, to receive the end of the adjoining section of the pump stock.

The object of my machine is to effect the entire boring of the section of the stock, and the trimming of the same at a single operation. The hollow boring shaft or tube requires the support of guides $a\ a$ until it fully enters the log, then it is desirable to remove the guides to permit the passage of the log and carriage.

The shavings are discharged at the bottom of the tube.

What I claim and desire to secure by Letters Patent is,

The combination of the sliding guides $a\ a$ with the levers $f\ f$, and timber carriage C, operating as, and for the purpose set forth.

In testimony whereof, I have hereunto signed my name before two subscribing witnesses.

EMMETT QUINN.

Witnesses:
GEO. PATTEN,
JOHN S. HOLLINGSHEAD.